United States Patent [19]
Cargille

[11] Patent Number: 5,859,368
[45] Date of Patent: Jan. 12, 1999

[54] TUNNELING-BASED ROTATION RATE SENSOR

[76] Inventor: Donald R. Cargille, 13303 Summertime La., Culver City, Calif. 90230

[21] Appl. No.: 632,186

[22] Filed: Apr. 15, 1996

[51] Int. Cl.⁶ .................................................. G01P 9/04
[52] U.S. Cl. ........................... 73/504.15; 73/504.14
[58] Field of Search .................... 73/504.15, 504.14, 73/510, 514.16, 514.17, 514.18, 514.32, 862.625, 504.02, 504.12; 250/306

[56] References Cited

U.S. PATENT DOCUMENTS

| | | | |
|---|---|---|---|
| 3,806,668 | 4/1974 | Hilliker | 179/100.4 |
| 4,080,625 | 3/1978 | Kawamoto et al. | 358/128 |
| 4,638,669 | 1/1987 | Chou | 73/514.25 |
| 5,048,339 | 9/1991 | Neuhaus | 73/514.25 |
| 5,211,051 | 5/1993 | Kaiser | 73/514.38 |
| 5,265,470 | 11/1993 | Kaiser | 73/862.625 |
| 5,285,686 | 2/1994 | Peters | 73/504.15 |
| 5,293,781 | 3/1994 | Kaiser et al. | 73/862.625 |
| 5,563,344 | 10/1996 | Kaiser | 73/514.36 |
| 5,596,194 | 1/1997 | Kubena | 250/306 |
| 5,604,309 | 2/1997 | Ward | 73/514.17 |
| 5,604,311 | 2/1997 | Kumar et al. | 73/504.14 |

OTHER PUBLICATIONS

Putty et al., A Micromachined Vibrating Ring Gyroscope, Solid–State Sensor and Actuator Workshop, Hilton Head, South Carolina, Jun. 1994, pp. 213–220.

Considine, *Van Nostrand's Scientific Encyclopedia, Seventh Edition*, Van Nostrand Reinhold 1989, p. 773.

Kenney et al., "Micromachined silicon tunnel sensor for motion detection", *Applied Physics Letters*, vol. 58, No. 1, Jan. 7, 1991, pp. 100–102.

Horowitz et al., *The Art of Electronics*, Cambridge University Press, 1989, pp. 641–655.

*Primary Examiner*—Christine K. Oda
*Attorney, Agent, or Firm*—Terje Gudmestad; Geogrann S. Grunebach; Michael W. Sales

[57] ABSTRACT

A high-accuracy, low-cost rotation rate sensor is based on a vibrating mechanical element induced to laterally oscillate. When rotated, the element, preferably a cantilever beam, is subjected to a Coriolis force that is proportional to the rate of rotation. The Coriolis force, if not counteracted, would cause the beam to move vertically. Vertical motion is detected with a highly sensitive tunneling tip sensor positioned below the beam. A wide bandwidth control circuit applies a counteracting force to the beam to keep the gap between tip and beam constant. This counteracting force varies with and provides an indication of the rotation rate. Lateral oscillation is induced by applying an electrostatic force to the beam with narrow, bipolar pulses that improve the sensor's stability and accuracy. A quadrature suppression circuit is employed if needed to prevent an oscillation that is tending to tilt due to imperfections in sensor construction, by activating electrodes positioned on a substrate below the oscillating beam to counteract the tendency. An alternative embodiment of the invention utilizes a tunneling tip to provide both lateral and vertical position sensing of an oscillating beam.

31 Claims, 8 Drawing Sheets

TUNNELING-BASED ROTATION RATE SENSOR

BACKGROUND OF THE INVENTION

1. Field of the Invention

This invention relates to the field of gyroscopes and rotation rate sensors, and more particularly to rotation rate sensors that utilize an oscillating mechanical element to sense rotation rate.

2. Description of the Related Art

Many methods have been developed to sense rotation rate. Gimbaled spinning wheel, ring laser, and vibrating ring gyroscopes have all been successfully developed for this purpose. Many applications exist for devices that can sense rotation, such as traction control and ride stabilization systems for cars, and stabilization systems for aircraft and spacecraft. However, existing gyroscope designs tend to be too expensive for mass market applications.

One method of sensing rotation rate utilizes a vibrating mechanical element, in which the Coriolis force that arises when the element is rotated is used to measure rotation rate. Devices of this type include the hemispherical resonator gyroscope and the vibrating ring gyroscope. Such vibratory gyroscopes have no rotating parts and are easily miniaturized using micro-machining techniques. These type of devices are described in M. W. Putty and K. Najafi, "A Micromachined Vibrating Ring Gyroscope," *Solid-State Sensor and Actuator Workshop*, Hilton Head, S.C., June, 1994. However, these gyroscopes tend to be either very expensive or low accuracy devices.

A mechanical element is fixed at one end and extends along a y-axis. The free end of the element is made to oscillate along an x-axis. The element is then subjected to rotation about the y-axis. A Coriolis force, induced by the rotation of the element and orthogonal to the axes of oscillation and rotation, i.e. along the z-axis, will cause the path described by the element to change, unless constrained by a counteracting force. Rather than continuing to oscillate back and forth along the x-axis only, under a Coriolis force acting alone, i.e. with no counteracting forces, the element would describe an elliptical pattern, with motion in both z and x axes. The Coriolis effect is a well known phenomenon and is discussed in D. Considine, *Van Nostrand's Scientific Encyclopedia, Seventh Edition*, Van Nostrand Reinhold (1989), page 773. The Coriolis effect will cause the element, oscillating laterally along the x-axis and rotating about the y-axis, to experience a Coriolis force $F_c$ along the z-axis as follows:

$$F_c = 2mW_r x V_1$$

where m is the mass of the element, $W_r$ is the element's rotation rate and $V_1$ is the lateral velocity of the element. If a force is applied to the element to counteract the Coriolis force and prevent z-axis displacement, measuring this counteracting force will give the Coriolis force, which is directly proportional to the rate of rotation.

A rotation rate sensor based on this principle having a properly designed mechanical element, an accurate sensor for measuring z-axis displacement, and circuitry to control lateral oscillation and to generate a force that prevents displacement along the z-axis, can overcome the accuracy and cost deficiencies of other vibrating element rotation rate sensors.

SUMMARY OF THE INVENTION

The present invention seeks to provide a high accuracy, low cost, rotation rate sensor suitable for many applications, such as the automobile, spacecraft, and aircraft applications discussed above.

The rotation rate sensor is based on an oscillating mechanical element, preferably a cantilevered beam, that is fixed at one end and free to vibrate at the other end. The beam is induced to oscillate along an axis that is essentially parallel to the flat substrate, i.e. "laterally." When the beam is rotated about its longitudinal axis, it is subjected to a Coriolis force. The Coriolis force is proportional to the rate of rotation, and its direction is orthogonal to the beam's axes of oscillation and rotation. The Coriolis force, if not counteracted, will cause the path traveled by the oscillating beam to change from its purely lateral direction to an elliptical path, with motion in the "vertical" direction, i.e. along an axis perpendicular to the substrate, as well as the lateral direction. A force is applied to the beam to counteract the Coriolis force and prevent vertical motion. By measuring this counteracting force, the rotation rate can be determined.

Vertical motion is preferably measured by utilizing a "tunneling tip" sensor, mounted on the substrate below the oscillating beam. When a voltage is applied between the beam and the tunneling tip, and the gap between them is small (on the order of several Angstroms), a current will flow between them due to quantum-mechanical tunneling. The amount of tunneling current is a function of the gap width. The tunneling tip provides a highly accurate measurement of gap width.

A vertical control electrode is preferably mounted to the substrate, below the oscillating beam, for applying electrostatic force to control the vertical position of the beam. A vertical control circuit receives the tunneling current as an input, and provides a signal to the vertical control electrode to maintain the gap between the beam and tunneling tip constant. When subjected to a rotation-induced Coriolis force, this gap-maintaining signal includes a component that generates a force to counteract the Coriolis force. This component is a function of the Coriolis force, and thus to the rotation rate.

The relationship between tunneling current and gap width is highly non-linear. To maintain a constant gap width when the beam is subjected to a large rotation-induced force, it is essential that the vertical control circuit have a bandwidth that is considerably wider than the natural resonant frequency of the beam in either the vertical or lateral direction. An inadequate bandwidth will result in a reduced ability to maintain a constant gap, and thus to reduced rotation rate sensor accuracy. The preferred vertical control circuit has a bandwidth much wider than the higher of the two resonant frequencies, so that a constant gap width and accurate performance can be attained using the sensitive tunneling tip for vertical sensing.

A lateral control electrode, positioned adjacent to the oscillating beam, is preferably utilized to induce the beam to oscillate at its natural resonant frequency in the lateral direction. A lateral position sensor, positioned under the oscillating end of the beam, produces a signal that varies with the lateral position of the beam. A lateral control circuit preferably receives the lateral position signal, and provides pulses to the lateral control electrode that cause an attractive electrostatic force to be periodically imposed on the beam, inducing the beam to oscillate laterally at its natural resonant frequency. The pulses are preferably narrow, and timed to be applied as the beam is passing through the midpoint of its travel from one deflection extreme to the other, i.e. its "null" position. The electrostatic force applied on the beam is given by:

$$F = kV^2/x^2$$

where F is the electrostatic force, k is a constant, V is the voltage applied to the lateral control electrode, and x is the gap between the lateral control electrode and the oscillating beam. Having the $1/x^2$ term in the equation means that electrostatic force increases sharply as the gap between the lateral control electrode and the oscillating beam closes. A narrow pulse, provided only when the beam is near its null position and not at its deflection extremes, prevents the beam from being subjected to an excessive force that could cause it to be pulled beyond the point where it should reverse direction and possibly cause unstable oscillation.

It is also preferred that the lateral control circuit provide pulses to the lateral control electrode that are bipolar, i.e. the pulses alternate between a positive voltage and a negative voltage. Note that the tunneling tip produces a signal, proportional to Coriolis force, that is at the same frequency as the lateral oscillation. If all the lateral oscillation-inducing pulses have a positive polarity, there is a risk that this drive signal, being at the same frequency as the tunneling tip signal, will inadvertently electrically couple to the tunneling tip signal and reduce the accuracy of the rotation rate sensor. Due to the $V^2$ term in the electrostatic force equation above, the same force will be applied to the oscillating beam regardless of the polarity of the driving pulse. Thus, a bipolar pulse will provide pulses to the oscillating beam at the proper lateral oscillation frequency, but the tunneling tip will see a signal that is at half the frequency of lateral oscillation. This "half" frequency is easily discriminated against by circuitry that receives and processes the tunneling tip signal. Thus, the preferred lateral control circuit produces pulses to the lateral control electrode that are both narrow and bipolar.

The oscillating beam may tend to describe a path that is not parallel to the substrate when oscillating, even though not subjected to rotation. This can be due, for example, to imperfections in its construction. This "tilt tendency," if left uncorrected, can cause inaccuracy in the measurement of vertical motion. To counteract this tilt tendency, the invention preferably utilizes a quadrature suppression circuit. This circuit senses when a tilt condition is present by detecting a quadrature component in the constant gap-maintaining signal produced by the vertical control circuit. The quadrature suppression circuit then acts to reduce or eliminate this quadrature component by applying correcting forces to the beam via electrodes positioned on the substrate below the oscillating beam.

An alternative embodiment of the invention utilizes the tunneling tip to provide both lateral and vertical position sensing of the oscillating beam, eliminating the need for a lateral position sensor. A circuit receives the tunneling tip signal, and from it produces all the signals necessary to control lateral and vertical motion, as well as extracting the rotation rate signal itself. This approach simplifies the construction of the rotation rate sensor, but may result in a sensor with less accuracy and reliability than the preferred sensor discussed above.

Further features and advantages of the invention will be apparent to those skilled in the art from the following detailed description, taken together with the accompanying drawings.

DETAILED DESCRIPTION OF THE INVENTION

Figure 1:
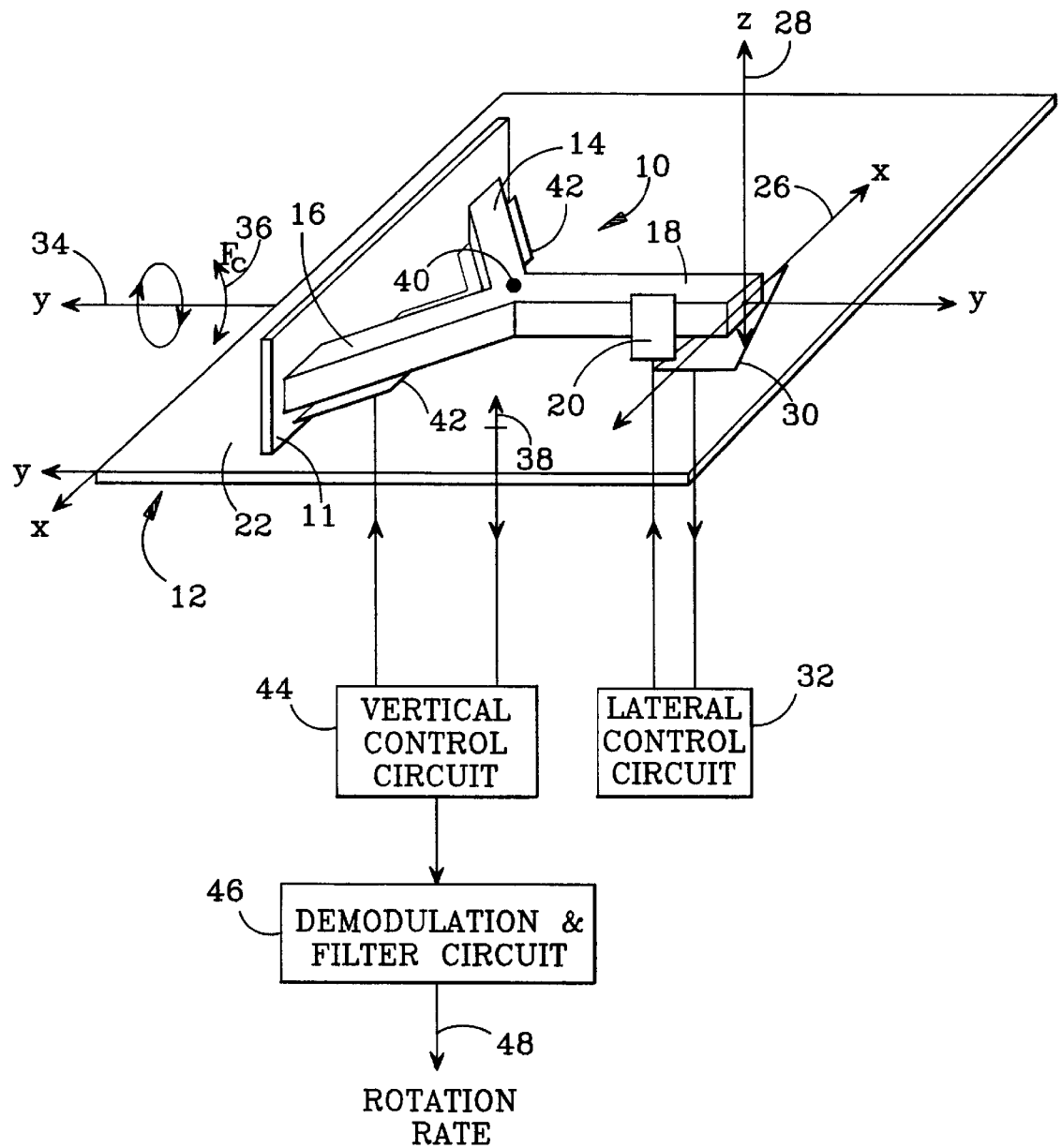
FIG. 1 is a combined perspective view and block diagram of the preferred rotation rate sensor.

The basic components of a preferred rotation rate sensor are shown in FIG. 1. A mechanical element, fixed at one end and free to vibrate at a second end, is induced to vibrate. By measuring the force required to prevent deviation in the path described by the vibrating mechanical element due to a rotation-induced Coriolis force, a rotation rate sensor is created. Preferably, this mechanical element is a Y-shaped cantilever beam 10, that extends from a beam support 11 and is suspended over an insulating substrate 12, with the two upper arms of the Y 14, 16 affixed to the support 11. The lower arm 18 of the cantilever beam 10, freely suspended over the substrate 12, is adjacent to a lateral control electrode 20 capable of subjecting the free arm 18 to an attractive electrostatic force. With no forces applied to the free arm 18, it is at its "null" position. By attracting the arm 18 with an electrostatic force, i.e. pulling the arm from its null position toward the lateral control electrode 20, then removing the force, the arm 18 is induced to freely oscillate at its natural resonant frequency along its axis of oscillation.

The substrate 12 preferably comprises a flat surface that lies in a first xy-plane, i.e. the "xy surface" 22. The beam support 11 rises from the substrate's xy surface 22, lying in an xz-plane. The cantilever beam 10 extends from the beam support 11 with its upper arms 14, 16 in contact with the support, and is suspended over the substrate's xy surface 22. The cantilever beam 10 is mounted such that the oscillation induced in the free arm 18 will be approximately parallel to the substrate's xy surface 22, i.e. "laterally" oscillating along a second, parallel x-axis 26 and thus parallel to the xy surface 22 of the substrate 12. Ideally, when the cantilever beam 10 is not subject to any changing external forces beyond that applied by the lateral control electrode 20, there is no oscillation or motion along the z-axis 28, perpendicular to the xy-planes, i.e. no "vertical" motion.

A lateral position sensor 30 is preferably located on the substrate's xy surface 22 to sense the lateral position of the oscillating free arm 18 over the full range of its deflection due to lateral oscillation. A lateral control circuit 32 is employed to receive the lateral position information produced by the lateral position sensor 30, and to produce an output to the lateral control electrode 20 to cause the free arm 18 to oscillate with a constant amplitude and at the arm's natural resonant frequency along its x-axis 26, i.e. its axis of oscillation.

If the cantilever beam 10 is rotated about its y-axis 34 it will be subjected to a rotation-induced Coriolis force 36. The magnitude of the Coriolis force 36, $F_c$, will be directly proportional to the rate of rotation, and is given by:

$$F_c = 2mW_r x V_1$$

where m is the mass of the cantilever beam 10, $W_r$ is the beam's rotation rate about its y-axis 34 and $V_1$ is the lateral velocity of the oscillating arm 18. The direction of the Coriolis force 36 will be orthogonal to the axes of oscillation (x-axis) and rotation (y-axis), i.e. along the z-axis 28. Subjected to a rotation-induced Coriolis force 36, the oscillating arm 18, if not also subjected to a counteracting force, would describe an elliptical path as it oscillates. That is, the cantilever beam 10 would exhibit motion vertically as well as laterally.

A vertical position sensor 38 for sensing vertical z-axis 28 displacement of cantilever beam 10 is preferably located on the substrate's xy surface 22, positioned under a point 40 on the cantilever beam where the three arms of the Y intersect. Lateral motion at the free end 18 of the arm will be nearly eliminated at this intersection point 40, since the point is held stationary by the V-shape of the two fixed upper arms 14, 16. The intersection point 40 is, however, free to move vertically in response to a rotation-induced force. Positioning the vertical position sensor under this point 40, effectively isolating the sensor from any lateral motion, significantly improves the accuracy of vertical displacement sensing.

A vertical control electrode 42 is preferably positioned on the substrate's xy surface 22 below the beam's upper arms 14, 16. This electrode 42 controls the vertical displacement of the cantilever beam 10 via the application of electrostatic force.

A vertical control circuit 44 receives the vertical displacement information from the vertical position sensor 38, and sends a signal to the vertical control electrode 42 which causes an electrostatic force to be generated that maintains a constant vertical displacement, i.e. to maintain a constant "gap width" between the vertical position sensor 38 and the beam 10. When the vertical displacement of the cantilever beam 10 is induced to change due to a rotation-induced Coriolis force 36, the vertical control circuit 44 provides a counteracting force to maintain a constant gap width. Since the Coriolis force 36 is proportional to the rotation rate of the cantilever beam 10 about its y-axis, the force required to counteract the Coriolis force is a function of rotation rate as well. Therefore, the signal produced by the vertical control circuit 44 to maintain a constant gap width is a function of rotation rate, and after being processed by a demodulation and filtering circuit 46, this signal 48 becomes the rotation rate output of the preferred sensor.

The vertical position sensor 38 is preferably a type of electrode known as a tunneling tip, though other types of displacement sensors that produce an output which varies with displacement could be used. The vertical control circuit 44 applies a voltage to the vertical control electrode 42 to provide an attractive force that pulls the cantilever beam 10 toward the vertical control electrode, and to the tunneling tip. When the cantilever beam 10 is close enough to the tunneling tip 38, typically within a distance of a few Angstroms, a bias voltage applied between the tunneling tip and the beam will induce a quantum-mechanical tunneling current, typically about 1 to 5 na, to flow between them. The tunneling current varies in accordance with the gap between cantilever beam 10 and tunneling tip 38. The relationship between gap width and tunneling current $I_T$ is given by the following equation:

$$I_T \alpha V_B \exp(-\alpha h \sqrt{\phi})$$

where $V_B$ is the bias voltage, $\alpha$ is a constant, h is the gap width, and $\phi$ is the work function. A tunneling tip of this type is described in Kenney et al., "Micromachined silicon tunnel sensor for motion detection," *Applied Physics Letters* Vol. 58, No. 1, Jan. 7, 1991, pp. 100–102.

Cantilever beam 10 movement along the z-axis 28 due to rotation can be determined very accurately by measuring the tunneling current. The vertical control circuit 44 provides closed loop control of gap width by comparing the tunneling current to a gap width setpoint, and varying the voltage to the vertical control electrode 42 to maintain a constant tunneling current, and thereby a constant gap width. This gap width-maintaining control voltage is a function of rotation rate.

A mechanical element such as the preferred cantilever beam 10 has two natural resonant frequencies that are relevant to the invention: one for vibration or oscillation along the x-axis 26, referred to as the "lateral natural resonant frequency," and one for oscillation along the z-axis 28, referred to as the "vertical natural resonant frequency." Preferably, the vertical control circuit 44 has a bandwidth that is considerably wider than either lateral or vertical natural resonant frequency. Tunneling current is a highly non-linear function of gap width. This non-linearity can cause a vertical control circuit having a bandwidth less than the higher of the two natural resonant frequencies to be unable to maintain a constant gap width when the beam is subjected to a rotation-induced Coriolis force. The ability to maintain a constant gap width is essential to accurate rotation rate sensing, so a vertical control circuit with an inadequate bandwidth will result in a degradation of sensor performance.

Figure 2:
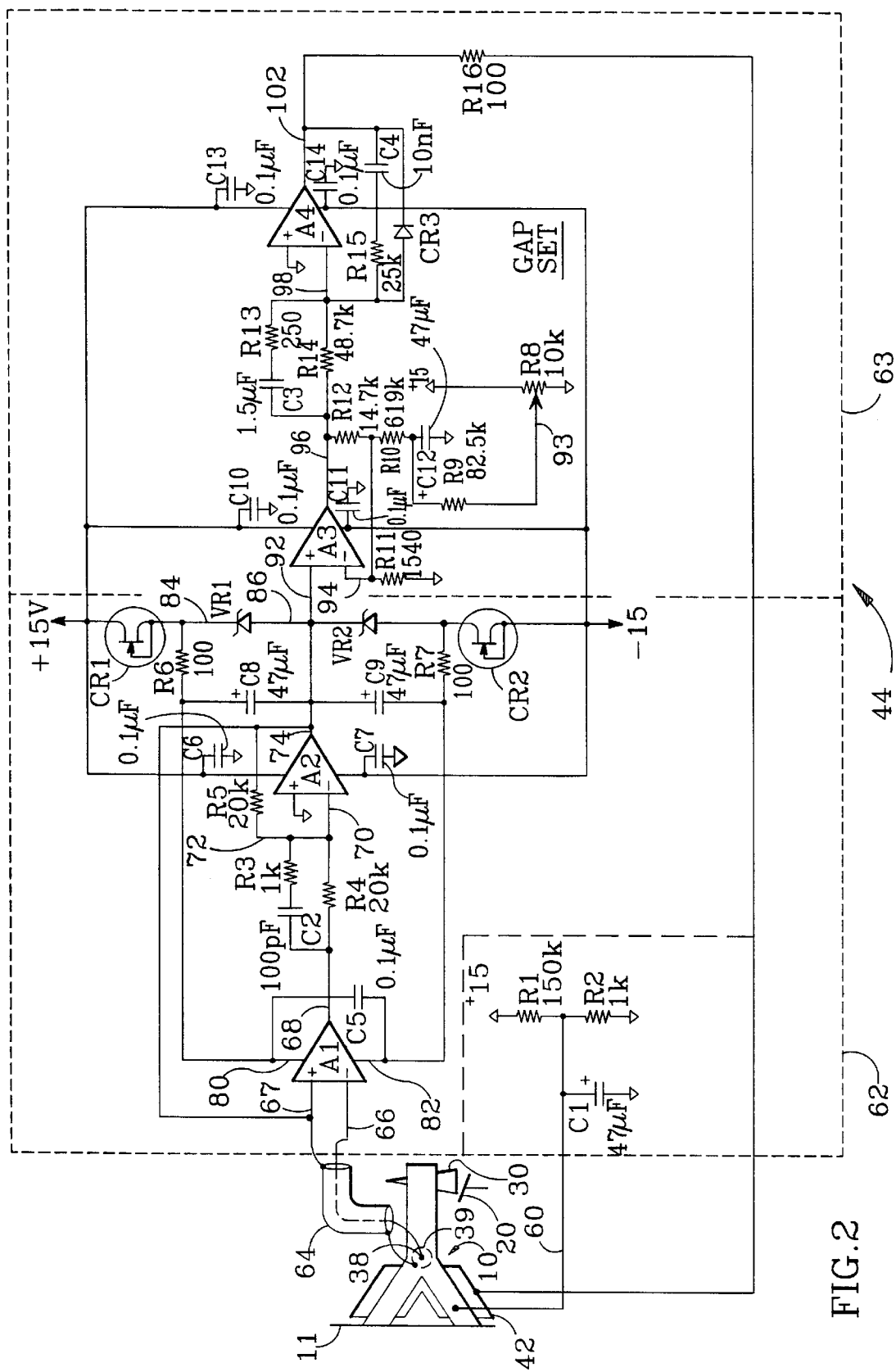
FIG. 2 is a schematic diagram of a vertical control circuit used with the preferred rotation rate sensor.

A preferred vertical control circuit 44 schematic is shown in FIG. 2. This circuit provides wide bandwidth, closed loop control of gap width. Voltage divider resistors R1 and R2 and noise-filtering capacitor C1, preferably 150 k$\Omega$, 1 k$\Omega$, and 47 $\mu$F respectively, are connected to a +15 volt supply to apply a bias voltage of about 0.1 volts via lead 60 across the cantilever beam 10 and tunneling tip 38 sufficient to initiate a flow of tunneling current between them.

The vertical control circuit 44 further comprises a unity gain bootstrap buffer circuit 62 for buffering the tunneling current signal, and a closed loop control circuit 63 for controlling gap width. The tunneling tip 38 and tunneling tip guard 39 are connected to the buffer 62 via very short coaxial cable 64 to the inverting 66 and non-inverting inputs, respectively, of an operational amplifier A1. The output 68 of amplifier A1 is fed to a compensation network comprising a capacitor C2 and a resistor R3 in series, shunted by a resistor R4, with the other side of the network connected to the inverting input 70 of an amplifier A2, along with a signal 72 fed back from amplifier A2's output 74 through a resistor R5. Amplifier A2's non-inverting input is grounded. C2, R3, R4 and R5 should be chosen to provide adequate bandwidth and stability to the bootstrap buffer. Adequate bandwidth is provided when the buffer's bandwidth is wider than the higher of the two natural resonant frequencies of the cantilever beam 10. Providing a bandwidth that is at least ten times the higher natural resonant frequency is preferable. A C2 of 100 pF in series with an R3 of 1 k$\Omega$, shunted with an R4 of 20 k$\Omega$, and a feedback resistor R5 of 20 k$\Omega$ are preferred values for these components.

The output 74 of amplifier A2 is the bootstrap buffer 62 output. This output 74 is fed back to the non-inverting input 67 of amplifier A1, where the guard 39 is also connected. Feeding the buffer's output 74 back to the non-inverting input 67 negates stray capacitance arising from the conductors connecting the tunneling tip 38 to amplifier A1. Stray capacitance reduces bandwidth, and should be kept to a minimum.

A1 is connected to floating supply voltages 80, 82 that track the voltage at A1's inverting input 66, such that A1's positive supply voltage 80 is held ten volts above the voltage at the inverting input, and A1's negative supply voltage 82 is held ten volts below the input voltage. The positive supply voltage 80 is generated using a diode-connected N-FET CR1, preferably a 1N5313, as a constant current source, connected in series with and supplying about 4.3 ma to the anode 84 of a ten-volt zener diode VR1, preferably a 1N4958, whose cathode 86 is connected to the buffer's output signal 74. The junction of CR1 and VR1 is connected through a current-limiting resistor R6, preferably 100 Ω, to provide the positive input-tracking supply voltage 80 to A1. Similarly, CR2 and VR2 are used to provide the negative input-tracking supply voltage 82 to A1 through R7. These input-tracking, floating supply voltages negate stray capacitance arising within the internal circuitry of amplifier A1. Amplifier A2 receives a conventional ±15 volt supply voltage.

Vertical control circuit 44 further comprises a stable, high bandwidth closed loop control circuit 63. The output 74 of the bootstrap buffer 62 is fed to the non-inverting input 92 of an amplifier A3, which performs a subtraction function in the control circuit 63. A gap width setpoint voltage 93, for setting the tunneling tip 38 to cantilever beam 10 displacement that is to be maintained by the vertical control circuit 44, is generated by a potentiometer R8. R8 is preferably a 10 kΩ potentiometer, connected to the +15 volt supply voltage. The gap width setpoint voltage 93 is connected to the inverting input 94 of amplifier A3 via resistors R9 and R10, preferably 82.5 kΩ and 619 kΩ respectively. Resistors R11 (preferably 1540Ω) and R12 (14.7 kΩ) in amplifier A3's feedback path establish A3's gain. Amplifier A3 subtracts the signal at its non-inverting input 92, representing the gap width as measured by the tunneling tip 38, from the gap width setpoint voltage established with R8, so that amplifier A3's output 96 is an error voltage representing the difference between the setpoint and actual gap width. Amplifier A3's output 96 is connected to a compensation network comprising a capacitor C3 is series with a resistor R13, shunted with a resistor R14, along with a resistor R15 and a capacitor C4 in the feedback path of an amplifier A4. The other side of the network is connected to the inverting input 98 of amplifier A4. The non-inverting input to A4 is connected to ground. Amplifier A4 functions as an integrator that attempts to produce an output 102 which drives the error voltage 96 produced by A3 to zero.

Figure 3:
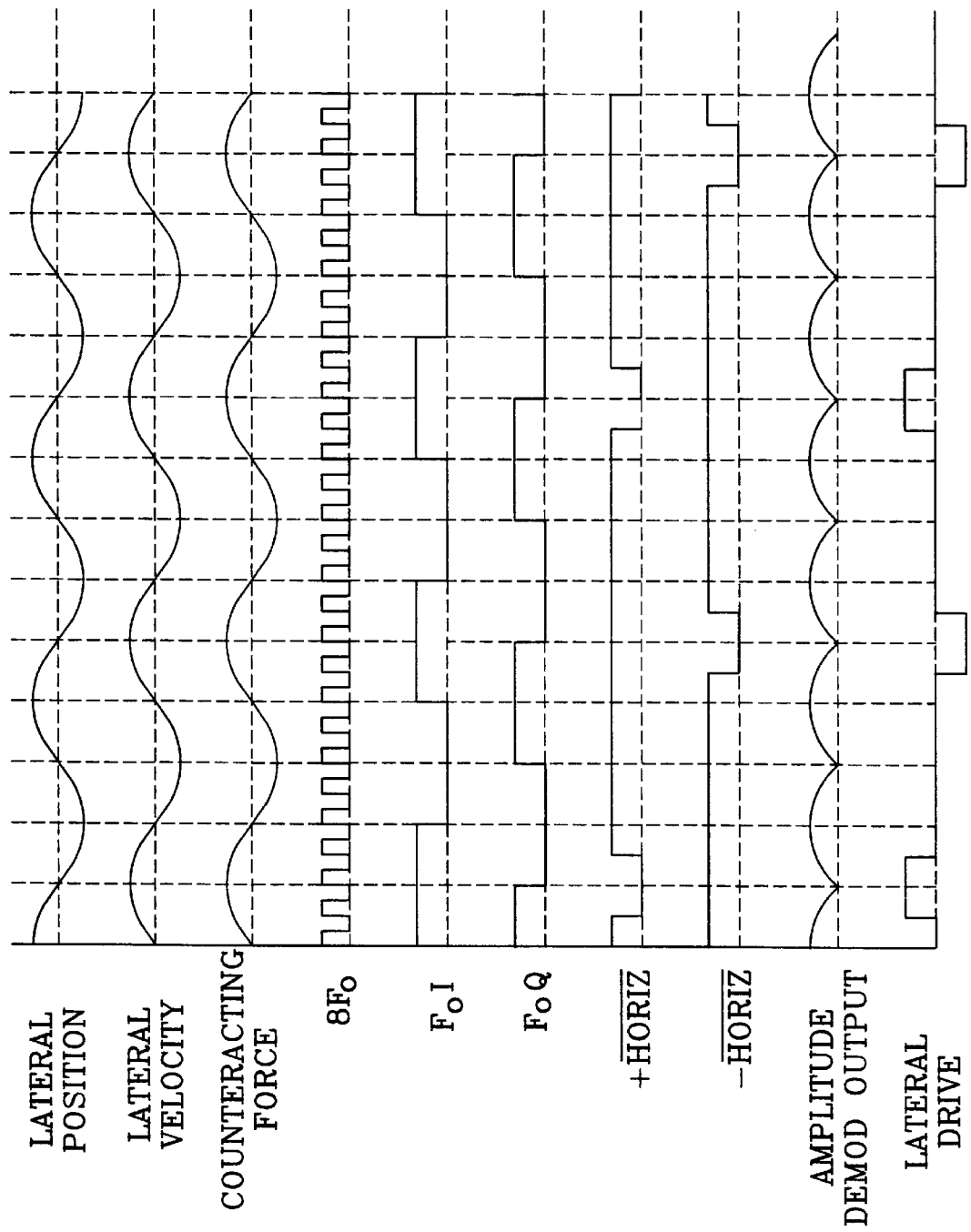
FIG. 3 depicts signal waveforms at various locations of the preferred rotation rate sensor.

Output 102 is the output of the vertical control circuit 44, and when connected to vertical control electrode 42 generates the forces necessary to maintain a constant gap width. Output 102 is essentially a DC signal with a small AC ripple riding on it. The DC component generates the force required to pull the beam 10 down from its initially rather high elevation above the tunneling tip 38, close enough to the tip for tunneling current to flow. The AC ripple component generates the force required to counteract the rotation-induced Coriolis force and maintain the gap width constant. This AC component, when demodulated and filtered as discussed below, is the output of the rotation rate sensor. The waveform of the AC component of output 102 is shown in FIG. 3, labeled as COUNTERACTING FORCE.

C3, C4, R13, R14, and R15 should be chosen to provide adequate bandwidth and stability to the closed loop control circuit 63, as defined above. A C3 of 1.5 nF in series with an R13 of 250 Ω, shunted with an R14 of 48.7 kΩ, with a C4 of 10 nF in series with an R15 of 25 kΩ in A4's feedback path are preferred values for these components.

A diode CR3, preferably a 1N3595, is connected in parallel with amplifier A4's feedback components C4 and R15, with the anode connected to non-inverting input 98. CR3 is used to prevent an inadvertent negative voltage from appearing at the output 102 of A4, which could cause an uncontrolled runaway loop condition. In the absence of CR3, a runaway loop condition could occur as follows:

The output 102 of A4 is connected via a current-limiting resistor R16, preferably 100 Ω, to vertical control electrode 42. The attractive electrostatic force that the vertical control electrode applies to the cantilever beam 10 is defined by the following equation:

$$F_1 = k_1 V_1^2 / X_1^2$$

where $F_1$ is the electrostatic force, $k_1$ is a constant, $V_1$ is the voltage applied to the vertical control electrode 42, and $x_1$ is the gap between the vertical control electrode 42 and the cantilever beam 10. Having the $V_1^2$ term in the equation means that the cantilever beam 10 will be pulled toward the vertical control electrode 42, regardless of whether the voltage applied to the vertical control electrode is positive or negative.

A non-zero voltage at the output 102 of amplifier A4 means that the gap width is too wide, and the cantilever beam 10 must be pulled down to maintain the gap at the gap width setpoint. If A4's output 102 is allowed to go negative, A4 will experience positive feedback, causing an uncontrolled runaway loop condition with the cantilever beam 10 pulled down as hard as the circuit 63 permits. Amplifier A4's output 102 needs to be positive so that its feedback will be negative, and the closed loop will be controlled. Diode CR3 insures that A4's output 102 cannot go negative.

Bypass capacitors, preferably 0.1 μF, are preferably connected between each amplifier's supply voltage pins and ground. A bypass capacitor C5 is connected across the supply voltage pins 80, 82 of amplifier A1. Bypass capacitors C6 and C7 are connected to the positive and negative supply voltage pins, respectively, of amplifier A2. Similarly, bypass capacitors C10 and C11 are connected to the supply voltage pins of amplifier A3, and bypass capacitors C13 and C14 are connected to the supply voltage pins of amplifier A4. C5, C6, C7, C10, C11, C13, and C14 should be mounted close to their respective amplifier's supply voltage pins.

A noise-filtering capacitor C8, preferably 47 μF, is preferably connected between the positive supply voltage pin 80 of amplifier A1 and the output 74 of amplifier A2. Similarly, a noise-filtering capacitor C9 is connected between A1's negative supply voltage pin 82 and the output 74 of A2. A noise-filtering capacitor C12, preferably 47 μF, is preferably connected between the junction of resistors R9 and R10 and ground.

For improved performance, the length of the following leads should be kept very short: between the tunneling tip 38 and A1, between the junction of R3, R4, and R5 and the inverting input 70 of A2, between C3 and R13, and between the junction of R13, R14, R15 and CR3 and the inverting input 98 of amplifier A4.

A vertical control circuit 44 using the preferred components discussed above can achieve a bandwidth of about 125 kHz, which is adequate for cantilever beams whose highest natural resonant frequency (vertical or lateral) is 12.5 kHz or less.

The cantilever beam's free arm 18 oscillates laterally at the arm's lateral natural resonant frequency. The lateral position sensor 30 (and associated circuitry, discussed below) produces an output that varies as the arm oscillates, as shown by the waveform labeled LATERAL POSITION in FIG. 3. When the arm 18 is passing through its null position, the output voltage of the lateral position sensor 30 is zero. As the arm 18 reaches its point of maximum deflection in one lateral direction, the output of sensor 30 reaches a maximum positive voltage. As the arm 18 reaches its point of maximum deflection in the other lateral direction, the output reaches a maximum negative voltage. Thus, as the arm 18 oscillates, a sinusoidal lateral position signal is produced. A lateral position sensor and associated circuitry that produces an output of this type operates by sensing capacitance variations, and is described in U.S. Pat. No. 3,806,668 to Hilliker, and U.S. Pat. No. 4,080,625 to Kawamoto et al.

The lateral velocity of the arm 18 is also shown in FIG. 3 (LATERAL VELOCITY). The velocity of arm 18 is greatest as the arm passes through its null position, and slows to zero as it nears and reaches either lateral deflection extreme. Thus, a plot of lateral velocity is 90 degrees out of phase with the lateral position signal.

Under the influence of a rotation-induced Coriolis force 36, the motion of the arm 18 would, if not restrained by a counteracting force, describe an elliptical path, with motion along the z-axis 28 as well as the x-axis 26. To maintain a constant gap width, the counteracting force supplied by the vertical control circuit 44 needs to be greatest when the lateral motion of the arm 18 takes it through its null position. Thus a plot of the counteracting force (COUNTERACTING FORCE in FIG. 3) will be in phase with the LATERAL VELOCITY waveform, with both reaching their peaks at the midpoint of the arm's travel in each lateral direction. Signals that are in phase with the LATERAL VELOCITY and COUNTERACTING FORCE waveforms will be referred to herein as "in-phase."

Recall also that the arm 18 is made to laterally oscillate at its lateral natural resonant frequency. This frequency is referred to herein as $F_0$. The frequency of the COUNTERACTING FORCE waveform will be at the same frequency as the lateral oscillation, i.e. at $F_0$.

Figure 4:
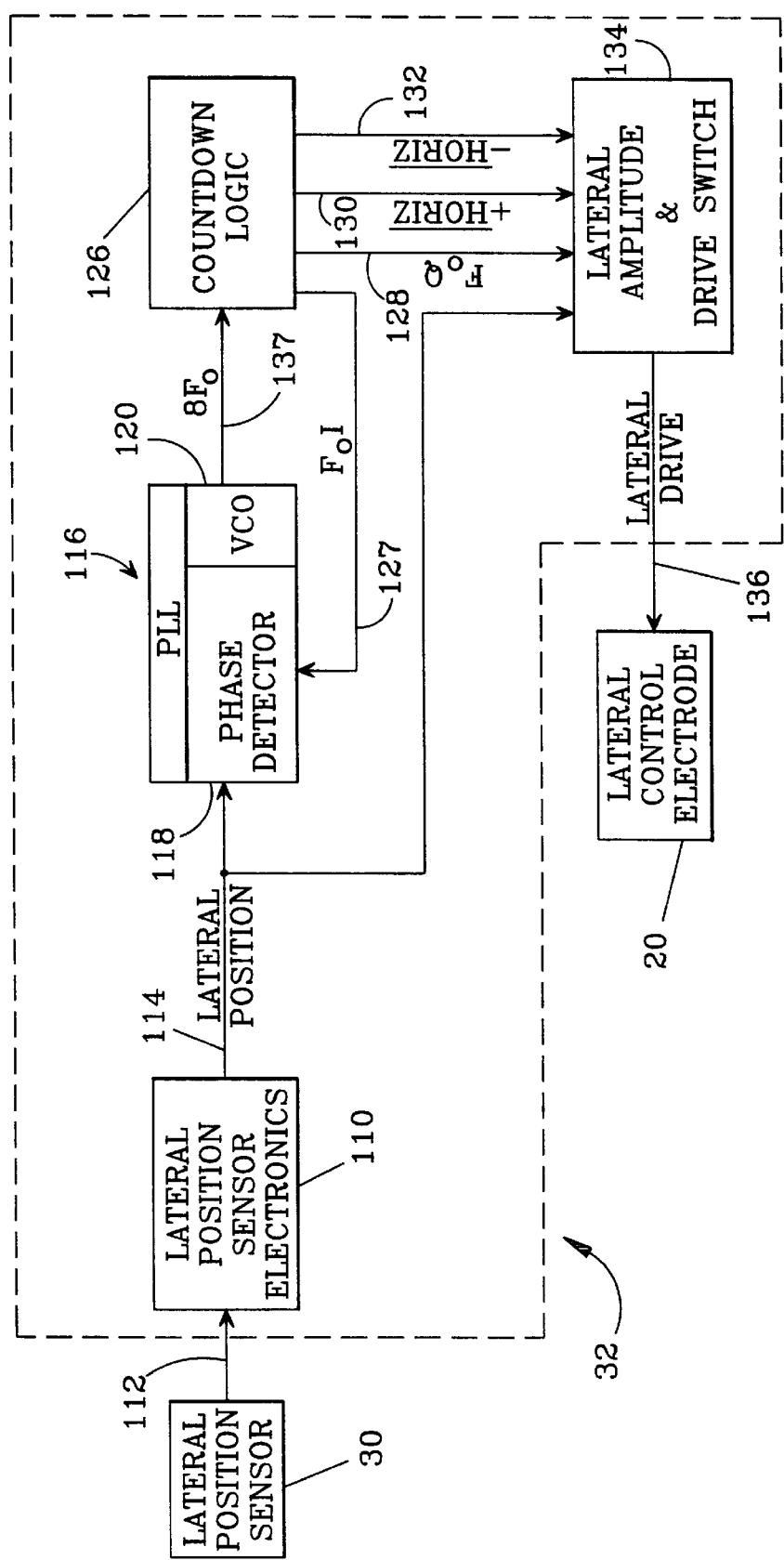
FIG. 4 is a block diagram of a lateral control circuit used with the preferred rotation rate sensor.

The lateral control circuit 32 is used to maintain the lateral oscillation of the cantilever beam's free arm 18 at its lateral natural resonant frequency, and to generate control signals used throughout the rotation rate sensor's circuitry. A block diagram of the preferred lateral control circuit 32 is shown in FIG. 4, and comprises the following subcircuits: circuitry 110 associated with the lateral position sensor 30 for producing the LATERAL POSITION signal 114; a phase-locked loop circuit 116, comprising a phase detector 118 and a voltage-controlled oscillator 120, to detect and maintain lateral oscillation at the lateral natural resonant frequency; a countdown logic circuit 126 to generate various control signals ($F_0I$ on line 127, $F_0Q$ on line 128, $\overline{+HORIZ}$ on line 130 and $\overline{-HORIZ}$ on line 132); and a lateral amplitude and drive switch circuit 134 for generating a LATERAL DRIVE signal 136 sent to the lateral control electrode 20.

The lateral position sensor 30 is connected to its associated processing circuitry 110 as discussed above, via wire 112. The LATERAL POSITION signal on line 114 repeats at the lateral natural resonant frequency ($F_0$), and is fed to the phase-locked loop (PLL) circuit 116. The PLL's phase detector 118 compares LATERAL POSITION on line 114 with a square wave signal $F_0I$ on line 127 that is derived from the PLL's VCO 120 output 137 and is 90 degrees out of phase with LATERAL POSITION. $F_0I$ is shown in FIG. 3, and is generated by the countdown logic circuit 126. The PLL 116 locks the phase of LATERAL POSITION on line 114 to match that of $F_0I$, producing an "in-phase" square-wave output signal 137 having a frequency equal to 8 times the lateral natural resonant frequency. This PLL output 137 is labeled in FIG. 3 as "$8F_0$." The $8F_0$ signal is in turn used to generate a signal to the lateral control electrode to induce the arm 18 to oscillate at its lateral natural resonant frequency. In this way, the lateral natural resonant frequency is locked onto and maintained by the PLL 116. Phase-locked loop circuits are well known in the industry. A phase-locked loop of this type is described in Horowitz and Hill, *The Art of Electronics*, Cambridge University Press, (1989), pp. 641–655.

The countdown logic circuit 126 receives the PLL output signal $8F_0$ on line 137, and from it derives the control signals mentioned above: $F_0I$ on line 127, $F_0Q$ on line 128, $\overline{+HORIZ}$ on line 130, and $\overline{-HORIZ}$ on line 132. These signals are preferably derived using J–K flip-flops, NAND gates and inverters well known to those skilled in the art.

The lateral amplitude and drive switch circuit 134 receives the LATERAL POSITION signal on line 114, the $F_0Q$ signal on line 128, $\overline{+HORIZ}$ on line 130, and $\overline{-HORIZ}$ on line 132 signals as inputs, and produces the LATERAL DRIVE signal 136 shown in FIG. 3. The LATERAL DRIVE signal features narrow, bipolar pulses for providing the electrostatic force needed to induce cantilever beam arm 18 to oscillate at its lateral natural resonant frequency.

The LATERAL DRIVE signal 136 pulses are preferably narrow and have an active duty cycle of ⅛. The attractive electrostatic force that the lateral control electrode 20 applies to the cantilever beam arm 18 is defined by the following equation:

$$F_2 = k_2 V_2^2 / x_2^2$$

where $F_2$ is the electrostatic force, $k_2$ is a constant, $V_2$ is the voltage applied to the lateral control electrode 20, and $x_2$ is the gap between the lateral control electrode 20 and the arm 18. The force equation is non-linear due to the $V_2^2/x_2^2$ term. Thus, the force applied to the arm 18 will increase sharply as the gap between the arm 18 and the lateral control electrode 20 closes. Continuing to apply electrostatic force as the gap closes may cause lateral oscillation to become unstable, as the sharply increased force may pull the arm 18 beyond the point where it would normally reverse direction—a condition known as "snap-over." To avoid a snap-over condition, the driving pulse is preferably timed to be applied while the arm 18 is passing through its null position, and the pulse is kept narrow, such that the electrostatic force is removed before the arm reaches the endpoint of its lateral travel in the direction toward the lateral control electrode 20. Timing the driving pulse to be applied near the arm's null position also provides the maximum deflection for a given amount of electrostatic force.

The LATERAL DRIVE signal 136 also features bipolar pulses. This is desirable because the frequency of the LATERAL DRIVE signal on line 136, i.e. $F_0$, is the same as the lateral natural resonant frequency of the arm 18, as well as the frequency of the motion detected by the tunneling tip 38. If the LATERAL DRIVE signal 136 uses unipolar drive pulses, there is a risk that LATERAL DRIVE will inadvertently electrostatically couple with the tunneling tip signal, i.e. the tunneling current. Since the tunneling tip signal is the input to the vertical control circuit 44, this coupling can reduce the vertical control circuit's ability to maintain a constant gap width, which in turn can reduce the accuracy of the sensor.

To reduce this problem of inadvertent electrostatic coupling, LATERAL DRIVE uses bipolar pulses. The arm 18 continues to be driven at the proper frequency, since the $V_2^2$ term in the force equation renders the polarity of the driving pulse irrelevant. However, the tunneling tip 38 now sees a drive voltage that is half of the lateral oscillation frequency, which can be easily discriminated against by the (synchronous) demodulation and filtering circuit 46 that processes the output 102 of the vertical control circuit 44.

Thus, a narrow, bipolar LATERAL DRIVE signal is preferred to prevent arm "snap-over" and inadvertent electrostatic coupling with the tunneling current signal from the tunneling tip 38.

Figure 5:
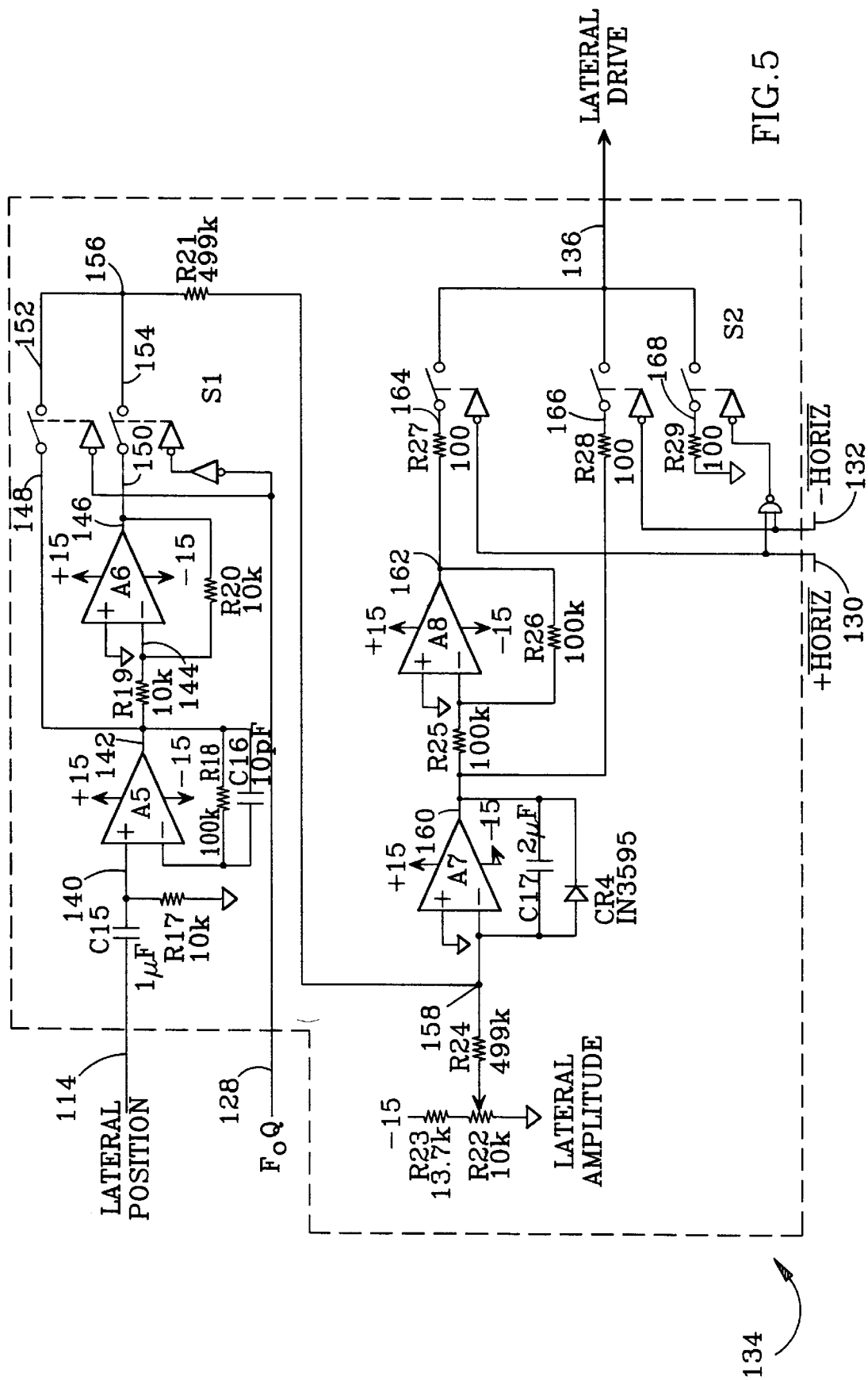
FIG. 5 is a schematic diagram of a lateral amplitude and drive switch circuit used with the preferred rotation rate sensor.

A preferred lateral amplitude and drive switch circuit 134, for producing the narrow, bipolar LATERAL DRIVE 136 pulses discussed above, is shown in FIG. 5. The LATERAL POSITION signal 114 is first synchronously demodulated to extract a signal having a DC component that is proportional to the amplitude of lateral deflection, using $F_0Q$ on line 128 as a reference signal. Synchronous demodulation is preferably accomplished as follows: the LATERAL POSITION signal 114 is AC coupled via a capacitor C15, preferably 1 $\mu$F, to the non-inverting input 140 of a unity gain buffer amplifier A5. Resistors R17 and R18, preferably 100 k$\Omega$, establish A5's gain at one, and a capacitor C16, preferably 100 pF, is included to counteract any stray capacitance existing between the input 140 to A5 and ground. Amplifier A5's output 142 is fed to the inverting input 144 of another amplifier AG via a resistor R19, with A6 providing at its output 146 a unity gain inverted version of A5's output signal 142. Resistor R19 and A6 feedback resistor R20, both preferably 10 k$\Omega$, set the gain of A6 equal to one. A double-pole analog switch S1 receives the inverted 146 and non-inverted 142 versions of the buffered LATERAL POSITION signal at its inputs 148, 150. Signal $F_0Q$ on line 128 is then used to repetitively and alternately close one pole of S1 and open the other. The two switch outputs 152, 154 are summed together at summing node 156. LATERAL POSITION on line 114 is in-phase with $F_0Q$ on line 128, and thus when the two switch outputs 152, 154 are summed they create a full-wave rectified sine wave. This signal is shown in FIG. 3 as AMPLITUDE DEMOD OUTPUT. The DC component of this output 156, i.e. the output of the synchronous demodulator, is a positive voltage, proportional to the amplitude of lateral deflection.

This output 156 is connected to one end of a resistor R21, preferably 499 k$\Omega$, with the other end of R21 connected to a control loop circuit that maintains the amplitude of lateral deflection at a preset amount. This amount is set with a lateral amplitude setpoint potentiometer R22, preferably 10 k$\Omega$, connected via a series resistor R23 (preferably 13.7 k$\Omega$) to the $-15$ volt supply voltage, to provide a negative voltage to a summing node 158 through resistor R24, preferably 499 k$\Omega$. This summing node 158 is also connected to the other end of resistor R21, so that the synchronous demodulator output 156 and the lateral amplitude setpoint are summed together at summing node 158. When the lateral amplitude is equal to the desired magnitude set with R22, the DC component of the demodulator output 156 will be equal in magnitude (and opposite in polarity) to the setpoint voltage. The summed signal 158 is fed to an integrating amplifier A7 to extract the DC component of the incoming full-wave rectified sine wave. A7's feedback capacitor C17 is preferably 2 $\mu$F. A diode CR4, preferably a 1N3595, is provided in A7's feedback path to prevent the output 160 of A7 from being a negative voltage. The lateral amplitude control loop requires negative feedback for proper functioning, and CR4 insures that A7 will always have negative feedback. The integrator output 160 is fed via a resistor R25 to another amplifier A8, connected as a unity gain inverting amplifier and providing an inverted version of the integrator output at its output 162. Resistor R25 and A8 feedback resistor R26, both preferably 100 k$\Omega$, establish the gain of A8. The inverted 162 and non-inverted 160 signals, essentially DC signals of equal and opposite polarity, are connected via resistors R27 and R28, respectively, to the inputs 164, 166 of a three-pole analog switch S2, with the third pole's input 168 connected via a resistor R29 to ground. R27, R28 and R29 are all preferably 100 $\Omega$. The $+\overline{\text{HORIZ}}$ 130 and $-\overline{\text{HORIZ}}$ 132 signals provide control signals to S2, sequentially and repetitively closing one pole at a time, while keeping the other two poles open. The outputs of the three poles are tied together, and this summing node 136 is the output of the lateral control circuit 32. The resulting narrow, bipolar pulses are shown in FIG. 3 as the LATERAL DRIVE signal 136.

The amplifiers of the amplitude loop shaping and drive switch circuit 134, i.e. A5, A6, A7 and A8, each preferably receive a $\pm15$ volt supply voltage, and it is recommended that each supply voltage pin be bypassed to ground with a 0.1 $\mu$F capacitor.

The preferred amplitude of lateral deflection is equal to one-half of the distance between the null position of arm 18 and the lateral control electrode 20.

Figure 6:
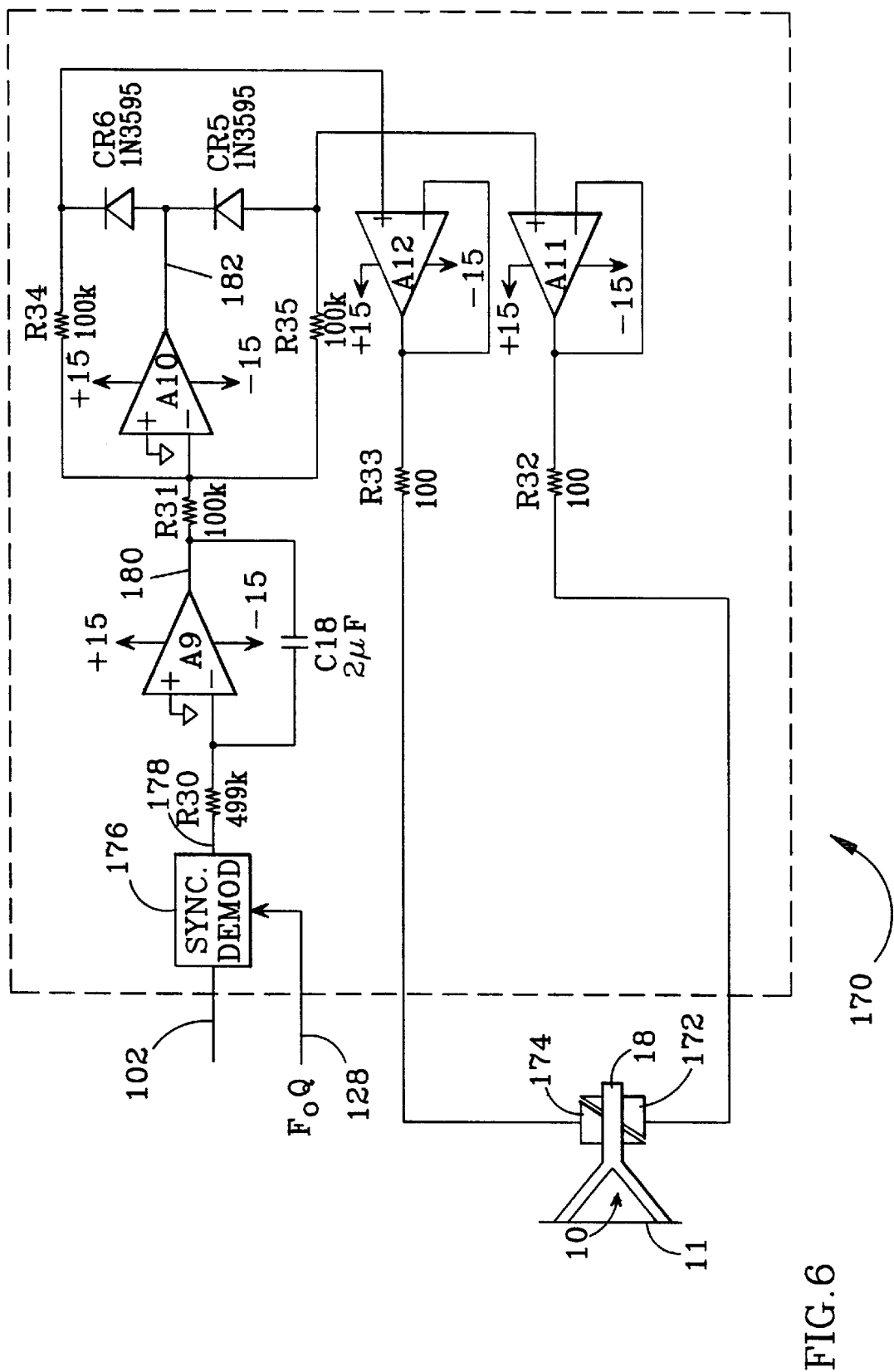
FIG. 6 is a schematic diagram of a quadrature suppression circuit that may be used with preferred rotation rate sensor.

Lateral oscillation of the arm 18 is ideally along an x-axis 26, parallel to the xy surface 22 of the substrate 12, with no movement along the z-axis 28. However, the arm's lateral oscillation may have a tendency to "tilt" with respect to the substrate's xy surface 22 (due, for example, to imperfections in the construction of cantilever beam 10), which if not corrected, would result in movement along the z-axis even when the sensor is not being rotated or subjected to a Coriolis force. This tilt tendency will manifest itself as a quadrature component in the AC ripple signal riding on the output 102 of the vertical control circuit 44 discussed above. If this quadrature component is too large, it could saturate the demodulation and filter circuit 46, preventing the accurate extraction of the rotation rate signal. To counter this unwanted vertical movement, a quadrature suppression circuit 170 and associated electrodes 172, 174 as shown in FIG. 6 may be employed. This circuit's purpose is to eliminate any quadrature component in the vertical control circuit's output 102 by detecting it and applying correcting forces to the arm 18 to reduce the unwanted motion. The correcting forces are applied to the arem 18 via quadrature suppression electrodes 172, 174.

The output 102 of the vertical control circuit 44 is first fed to a synchronous demodulator 176, similar to that used in the lateral control circuit 32, using $F_0Q$ 128 as a reference signal. A synchronous demodulator 176 providing some gain is used, as the AC ripple signal of interest is small. If there is no quadrature component in the signal 102, the DC component of the synchronous demodulator's output signal 178 will be essentially zero. A tilted lateral oscillation will result in a non-zero DC component in the output 178 that is positive for one direction of tilt, and negative for a tilt in the opposite direction.

The output 178 of the synchronous demodulator is fed via a resistor R30, preferably 499 k$\Omega$, to an amplifier A9, connected as an integrator, having a feedback capacitor C18, preferably 2 $\mu$F, for extracting the DC component of the incoming signal 178. The output 180 of A9 is connected via a resistor R31, preferably 100 k$\Omega$, to an inverting amplifier A10, which functions as follows: if the DC voltage at the integrator output 180 is positive, amplifier A10's output 182 is negative. This will forward-bias a diode CR5, thus providing a negative input voltage to a non-inverting buffer amplifier A11, whose non-inverting input is connected to the anode of CR5, thereby providing a tilt-correction voltage to quadrature suppression electrode 172 via a current-limiting resistor R32 (preferably 100 Ω). With A10 producing a negative voltage, a diode CR6 is reverse biased, and therefore no voltage will be applied to quadrature suppression electrode 174 via another non-inverting buffer amplifier A12, whose non-inverting input is connected to the cathode of CR6. Conversely, if the DC voltage at the integrator output 180 of A9 is negative, amplifier A10's output 182 is positive. This will forward bias diode CR6 to apply a positive tilt-correction voltage to quadrature suppression electrode 174 via amplifier A12 and its output current-limiting resistor R33. CR5 is reverse-biased, and thus no voltage is applied to quadrature suppression electrode 172. A10's gain setting resistors R31, R34 and R35 are preferably 100 kΩ, giving A10 a (negative) unity gain. Amplifiers A9, A10, A11 and A12 each preferably receive ±15 volt supply voltages, with 0.1 μF bypass capacitors at each supply pin. Diodes CR5 and CR6 are preferably 1N3595's.

Figure 7:
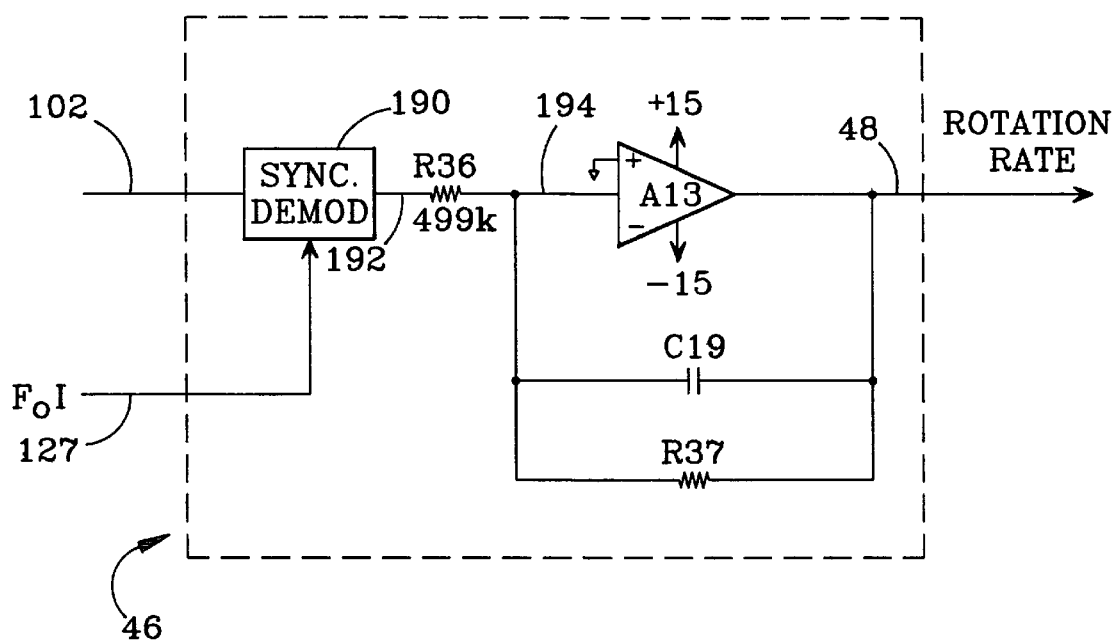
FIG. 7 is a schematic diagram of a demodulation and filtering circuit used with the preferred rotation rate sensor.

To obtain the rotation rate signal, the output 102 of the vertical control circuit 44 is processed through the demodulator and filter circuit 46. As shown in FIG. 7, the output 102 of the vertical control circuit is fed to a synchronous demodulator 190, similar to that used in the lateral control circuit 134. The synchronous demodulator 190 provides some gain, as the AC ripple signal of interest is small. The demodulator 190 uses $F_0I$ on line 127 as a reference signal, producing a full-wave rectified sinusoidal output signal 192 whose DC component is proportional to rotation rate.

Synchronous demodulator output 192 is fed via a resistor R36, preferably 499 kΩ, to the inverting input 194 of an amplifier A13, which is connected to function as a low-pass filter, to extract the DC component from the full-wave rectified signal 192. A13's parallel feedback resistor and capacitor, R37 and C19, should be chosen to provide a cutoff frequency to meet the requirements of the sensor. A lower cutoff frequency is desirable to provide the best filtration of demodulator ripple and noise, but will reduce the sensor's ability to quickly reflect changes in rotation rate. A higher cutoff frequency increases the speed at which the sensor output reacts to changes in rotation rate, but provides less noise filtering. The output 48 of A13 is an essentially DC signal proportional to the rotation rate of the cantilever beam about its y-axis, and is the rotation rate output of the sensor.

Amplifiers A1 and A2 are preferably OP15's, A3 and A4 are preferably OP42's, and A5 through A13 are preferably OP467's, all from Analog Devices. The preferred analog switch, i.e. switches S1 and S2, is the HI-201, from Harris.

Figure 10:
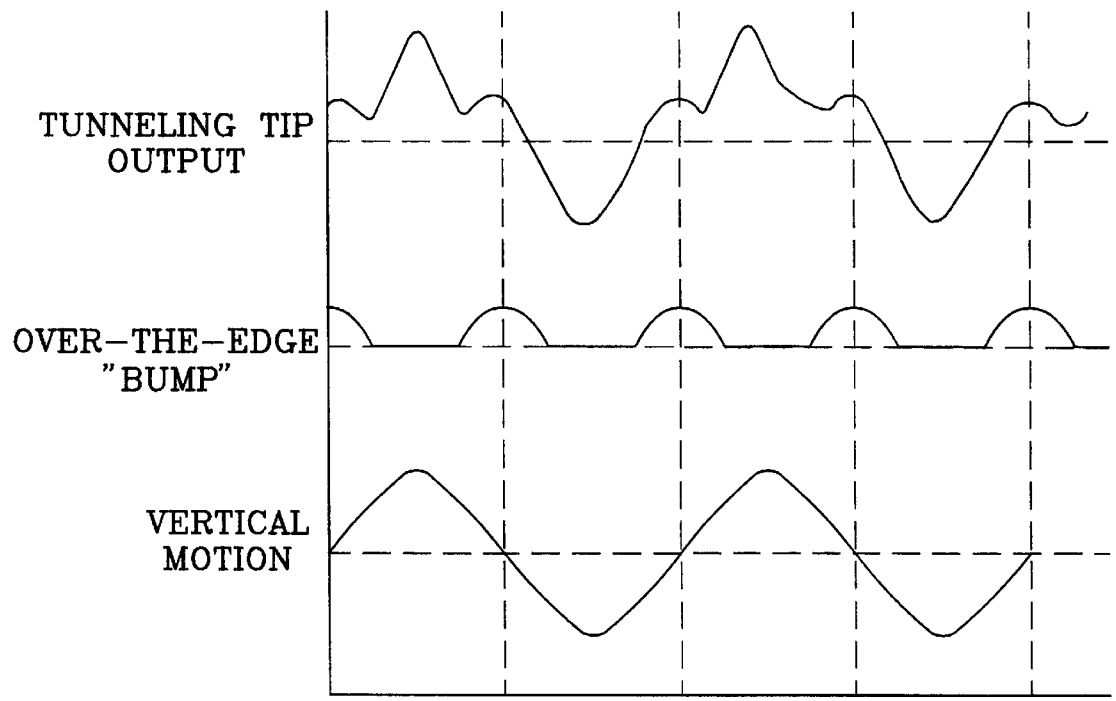
FIG. 10 depicts signal waveforms associated with the single sensor embodiment of FIG. 8.
Figure 8:
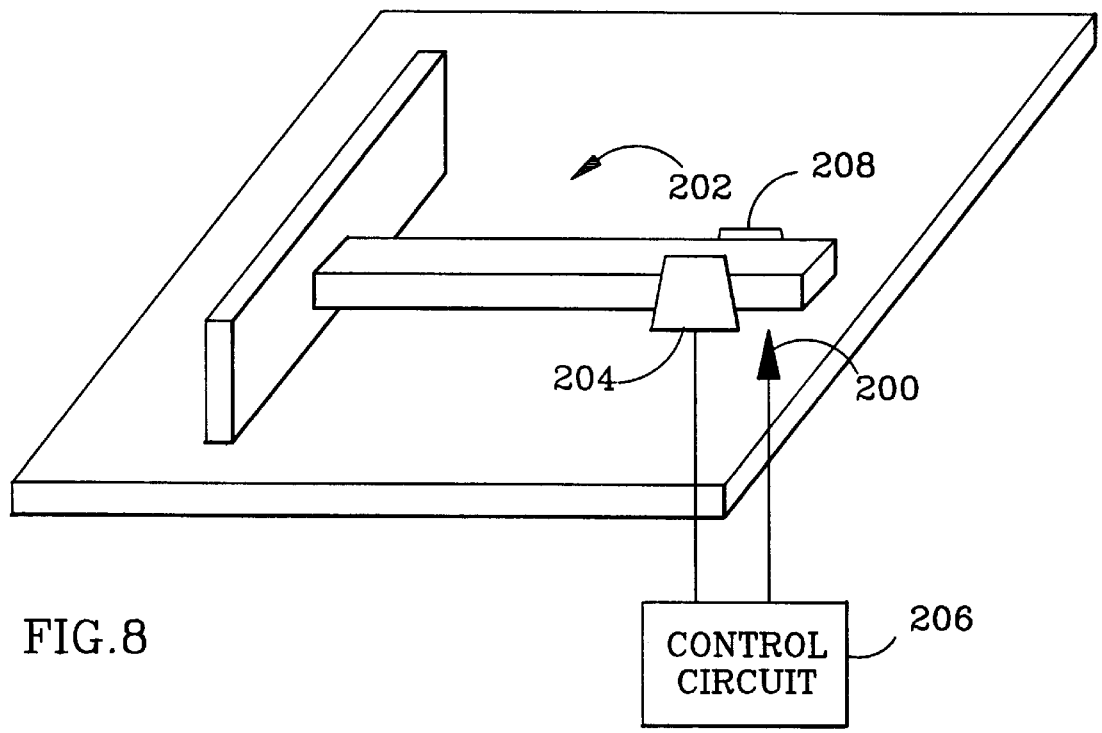
FIG. 8 is a perspective view of a single sensor embodiment of the invention.
Figure 9:
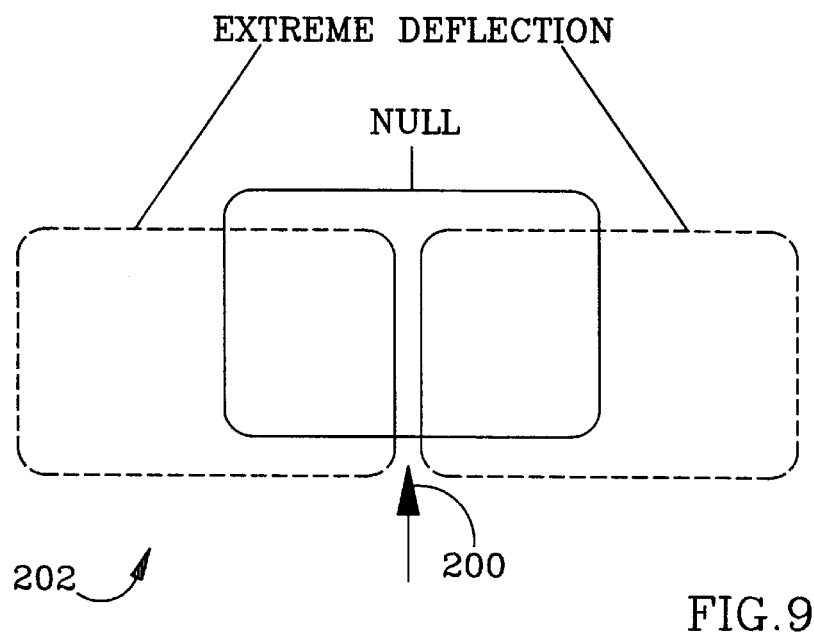
FIG. 9 is an elevation view of a cantilever beam used in the single sensor embodiment of FIG. 8.

An alternate embodiment of the rotation rate sensor, shown in FIG. 8, employs a tunneling tip 200 to sense the amplitude and frequency of lateral motion as well as vertical position sensing, eliminating the need for a lateral position sensor and its associated circuitry. As with the first embodiment, a cantilever beam 202 is driven to oscillate laterally with a lateral control electrode 204, while a control circuit 206 attempts to keep the gap between the tunneling tip and the cantilever beam constant. For this single sensor embodiment, however, the tunneling tip must be positioned at a point below the oscillating end of the cantilever beam, so that it can sense the full range of lateral motion, as well as any vertical deflection. As seen in the elevation view of the cantilever beam shown in FIG. 9, the beam 202 is depressed (lower) when it reaches a position of extreme deflection (shown in dashed lines) in either lateral direction, due to the action of the control circuit 206 as it attempts to maintain a constant gap width. When the beam 202 moves past the tunneling tip 200 and drops down, a large deflection signal will be generated as the tip tracks the edge of the beam, which is preferably rounded. This over-the-edge "bump" signal occurs with the same polarity at both edges and hence has a fundamental component that is twice the lateral oscillation frequency. This fact allows its separation and recovery from other components of the tunneling tip 200 signal. The waveforms in FIG. 10 show what the total tunneling tip output would look like for this embodiment, with its constituent vertical motion and "bump" components shown as well.

By synchronously demodulating the tunneling tip 200 signal with reference signals that are in-phase and 90 degree out of phase with the lateral natural resonant frequency of cantilever beam 202, all the control signals needed for the rotation rate sensor's operation can be generated. These include: a signal to generate the force necessary to maintain a constant gap, such that the force varies with rotation rate; a signal to control the frequency of lateral oscillation to match the cantilever beam's lateral natural resonance frequency; a signal to control the amplitude of lateral oscillation; and a signal to control the balance of the lateral oscillation, such that the cantilever beam 202 is centered over the tunneling tip 200, accomplished by providing the balance signal to a second lateral control electrode 208 positioned on the opposite side of the cantilever beam from the first lateral control electrode 204. The rotation rate signal itself is also extracted from the tunneling tip signal using synchronous demodulation.

Using a single sensor for both vertical and lateral sensing reduces the complexity of the rotation rate sensor, and may improve lateral sensing accuracy due to the highly sensitive nature of the tunneling tip 200. Vertical sensing accuracy may be reduced however, because the cantilever beam 202 is now laterally oscillating over the tunneling tip 200, rather than providing the essentially stationary, z-axis only motion offered by the Y-shaped beam 10 of the first embodiment. Imperfections on the bottom side of the beam 202 will also degrade vertical sensing accuracy. Another drawback of this embodiment is the risk inherent in having the cantilever beam 202 drop down below the tunneling tip 200 at the lateral dflection extremes. When the beam's direction of travel reverses, the vertical control circuitry may not be fast enough to prevent the beam 202 from hitting and damaging the tunneling tip 200.

The cantilever beam 202 for the single sensor embodiment may be a simple rod shape as shown in FIG. 8. Since the tunneling tip 200 is necessarily positioned at the oscillating end of the beam, the Y-shaped beam's advantage of subjecting the vertical position sensor 38 to vertical motion only is no longer usable.

The mechanical element, preferably either a Y or rod-shaped cantilever beam, can be made from many different materials, for example, nickel, but electrically conductive materials must be used in the following areas: where electrostatic forces are applied for inducing lateral oscillation and controlling vertical position; in the area above the tunneling tip so that a tunneling current can flow between tip and element; and below the deflecting end of the element, if capacitance variation sensing is used to sense lateral position, as described above. Elements having natural resonant frequencies ranging from 1 kHz to 60 kHz are known. It is preferable that a vertical control circuit have a bandwidth that is considerably higher, preferably at least ten times higher, than an element's lateral or vertical natural resonant frequency (whichever is higher), to reduce the negative effect on sensor performance of the non-linear tunneling current versus gap width function. The preferred vertical control circuit has a bandwidth of about 125 kHz. Thus, an element having a natural resonant frequency (vertical and lateral) of 12.5 kHz or less is recommended. An element formed from nickel, with a resonant frequency of 10 kHz, is preferred. A cantilever beam having a length along the y-axis of about 1 mm, with a lateral deflection amplitude in the range of 1 to 10 micrometers is preferred.

While particular embodiments of the invention have been shown and described, numerous variations and alternate embodiments will occur to those skilled in the art. Accordingly, it is intended that the invention be limited only in terms of the appended claims.

I claim:

1. A rotation rate sensor, comprising:
   a vibrating mechanical element that has a natural resonant frequency and is subject to a Coriolis force that is proportional to the rate of rotation of said element, said Coriolis force causing said element to move in a first direction,
   a vertical motion sensor that detects motion of said element in said first direction,
   a control circuit which applies a counteracting force to said element to maintain a gap between said element and said vertical motion sensor constant, said counteracting force varying with and providing an indication of the rate of rotation of said element, said control circuit having a bandwidth that is greater than said natural resonant frequency, said wider bandwidth tending to enhance the ability of said control circuit to maintain said gap constant, thereby improving sensor accuracy.

2. The rotation rate sensor of claim 1, wherein said vibrating mechanical element is a cantilever beam.

3. The rotation rate sensor of claim 1, wherein said vertical motion sensor is a tunneling tip.

4. The rotation rate sensor of claim 2, wherein said cantilever beam is Y-shaped, with first and second arms of the beam extending from a surface and forming a V, and the third arm of the beam extending from the junction of the first and second arms.

5. The rotation rate sensor of claim 1, wherein said mechanical element is induced to vibrate in a second direction, said element tending to deviate from said second direction of vibration when subjected to said Coriolis force, whereby said control circuit applies said counteracting force to prevent said deviation.

6. The rotation rate sensor of claim 5, wherein said second direction of element vibration is perpendicular to said first direction of element movement.

7. The rotation rate sensor of claim 5, wherein said mechanical element is induced to vibrate in said second direction by the application of electrostatic force.

8. The rotation rate sensor of claim 5, wherein said mechanical element is induced to vibrate at a natural resonant frequency along said second direction.

9. The rotation rate sensor of claim 6, further comprising a circuit for detecting that the vibration of said mechanical element is tending to deviate from said second direction when said element is not subject to a Coriolis force, and providing signals to cause said deviation to be prevented, thereby improving sensor accuracy.

10. A rotation rate sensor, comprising:
    a vibrating mechanical element that has a natural resonant frequency and is subject to a Coriolis force that is proportional to the rate of rotation of said element, said Coriolis force causing said element to move in a first direction, said mechanical element induced to vibrate in a second direction by the application of electrostatic force which is applied to said mechanical element with narrow bipolar pulses, said pulses tending to provide stable element vibration and improve sensor accuracy, said element tending to deviate from said second direction of vibration when subjected to said Coriolis force,
    a vertical motion sensor that detects motion of said element in said first direction, and
    a control circuit which applies a counteracting force to said element to maintain a gap between said element and said vertical motion sensor constant and to prevent said deviation from said second direction of vibration when subjected to said Coriolis force, said counteracting force varying with and providing an indication of the rate of rotation of said element, said control circuit having a bandwidth that is greater than said natural resonant frequency, said wider bandwidth tending to enhance the ability of said control circuit to maintain said gap constant, thereby improving sensor accuracy.

11. A rotation rate sensor, comprising:
    a substrate,
    a tunneling tip on said substrate,
    a cantilever beam fixed at one end and suspended above said substrate at a second end at a distance from said tunneling tip so that a tunneling current flows between said cantilever beam and said tunneling tip in response to a voltage applied across said cantilever beam and said tunneling tip, said tunneling current varying in accordance with a gap between said beam and said tunneling tip,
    a lateral control circuit which causes a force to be generated that induces said cantilever beam to laterally oscillate about a null position substantially parallel to said substrate, and
    a vertical control circuit which receives said tunneling current and causes an electrostatic force to be generated that maintains said gap between said cantilever beam and said tunneling tip substantially constant, said electrostatic force counteracting a Coriolis force that arises from rotation of said cantilever beam about an axis parallel to said cantilever beam, whereby said electrostatic force varies with and provides an indication of the rate of rotation, said vertical control circuit having a bandwidth that is greater than the natural resonant frequency of said cantilever beam along an axis perpendicular to or parallel to said substrate, for improving the ability of said vertical control circuit to maintain said gap constant when said cantilever beam is subjected to a rotation-induced force.

12. The rotation rate sensor of claim 11, wherein said substrate lies in a first xy-plane, said cantilever beam oscillates laterally along a second x-axis parallel to said substrate, and when not subjected to a counteracting force deflects along a z-axis in response to rotation about an axis parallel to said cantilever beam.

13. The rotation rate sensor of claim 11, wherein said lateral control circuit maintains said lateral oscillation at the natural resonant frequency of said cantilever beam along said axis of oscillation.

14. The rotation rate sensor of claim 11, wherein said tunneling tip is oriented along an axis perpendicular to said substrate.

15. The rotation rate sensor of claim 11, wherein said cantilever beam is Y-shaped, with first and second arms of the cantilever beam fixed and forming a V, and the third arm of said beam extending freely over said substrate from the junction of the first and second arms.

16. The rotation rate sensor of claim 15, wherein said tunneling tip is positioned on said substrate below a point on said cantilever beam where all three arms intersect, such that the lateral oscillation of said cantilever beam above said tunneling tip is substantially eliminated.

17. The rotation rate sensor of claim 11, further comprising a vertical control electrode on said substrate, for applying said electrostatic force on said cantilever beam in response to a signal from said vertical control circuit, to maintain said gap substantially constant.

18. The rotation rate sensor of claim 11, further comprising a lateral position sensor that provides a signal which varies in accordance with the frequency and amplitude of said lateral oscillation to said lateral control circuit, and a lateral control electrode which applies an electrostatic force on said cantilever beam that induces said lateral oscillation in response to a signal received from said lateral control circuit.

19. The rotation rate sensor of claim 11, wherein said cantilever beam is comprised of nickel.

20. The rotation rate sensor of claim 11, wherein said tunneling tip produces a signal that varies with the amplitude and frequency of said lateral oscillation in addition to varying with said gap between said cantilever beam and said tunneling tip.

21. The rotation rate sensor of claim 20, wherein said lateral control circuit and said vertical control circuit are combined into a single control circuit, said single control circuit receiving said tunneling tip signal as an input, and synchronously demodulating said tunneling tip signal to produce signals indicative of the motion of said beam in both the vertical and lateral directions that are connected to maintain said lateral oscillation at the cantilever beam's natural resonant frequency along an axis of oscillation, and to maintain a constant gap between said cantilever beam and said tunneling tip, wherein said gap maintaining signal varies with the rate of rotation.

22. The rotation rate sensor of claim 20, wherein said tunneling tip is positioned below the oscillating end of said cantilever beam such that said tunneling tip can sense the full range of said lateral oscillation.

23. The rotation rate sensor of claim 20, further comprising a first lateral control electrode positioned adjacent to said cantilever beam for inducing said beam to laterally oscillate, and a second lateral control electrode positioned adjacent to said cantilever beam and opposite said first lateral control electrode for balancing said lateral oscillation equally about said tunneling tip.

24. The rotation rate sensor of claim 20, wherein said cantilever beam is rod-shaped.

25. A rotation rate sensor, comprising:

a substrate, a tunneling tip on said substrate, a cantilever beam fixed at one end and suspended above said substrate at a second end at a distance from said tunneling tip so that a tunneling current flows between said cantilever beam and said tunneling tip in response to a voltage applied across said cantilever beam and said tunneling tip, said tunneling current varying in accordance with a gap between said beam and said tunneling tip, a lateral control circuit which causes a force to be generated that induces said cantilever beam to laterally oscillate about a null position substantially parallel to said substrate, a lateral position sensor that provides a signal which varies in accordance with the frequency and amplitude of said lateral oscillation to said lateral control circuit, and a lateral control electrode which applies an electrostatic force on said cantilever beam that induces said lateral oscillation in response to a signal received from said lateral control circuit, said lateral control circuit providing said signal to said lateral control electrode as narrow, bipolar pulses at the natural resonant frequency of said cantilever beam along an axis of oscillation, said pulses timed such that said pulses apply an electrostatic force on said cantilever beam only as the beam passes through said null position and not at deflection extremes, said timing tending to provide maximum deflection for a given force and stable lateral oscillation, said bipolar pulses reducing electrostatic coupling with said tunneling current, and a vertical control circuit which receives said tunneling current and causes an electrostatic force to be generated that maintains said gap between said cantilever beam and said tunneling tip substantially constant, said electrostatic force counteracting a Coriolis force that arises from rotation of said cantilever beam about an axis parallel to said cantilever beam, whereby said electrostatic force varies with and provides an indication of the rate of rotation, said vertical control circuit having a bandwidth that is greater than the natural resonant frequency of said cantilever beam along an axis perpendicular to or parallel to said substrate, for improving the ability of said vertical control circuit to maintain said gap constant when said cantilever beam is subjected to a rotation-induced force.

26. A rotation rate sensor, comprising:

a substrate, a tunneling tip on said substrate, a cantilever beam fixed at one end and suspended above said substrate at a second end at a distance from said tunneling tip so that a tunneling current flows between said cantilever beam and said tunneling tip in response to a voltage applied across said cantilever beam and said tunneling tip, said tunneling current varying in accordance with a gap between said beam and said tunneling tip, a lateral control circuit which causes a force to be generated that induces said cantilever beam to laterally oscillate about a null position substantially parallel to said substrate, a quadrature suppression circuit for maintaining said lateral oscillation of said cantilever beam substantially parallel to said substrate, by applying an electrostatic force to said cantilever beam through one or more quadrature suppression electrodes on said substrate below said cantilever beam, and a vertical control circuit which receives said tunneling current and causes an electrostatic force to be generated that maintains said gap between said cantilever beam and said tunneling tip substantially constant, said electrostatic force counteracting a Coriolis force that arises from rotation of said cantilever beam about an axis parallel to said cantilever beam, whereby said electrostatic force varies with and provides an indication of the rate of rotation, said vertical control circuit having a bandwidth that is greater than the natural resonant frequency of said cantilever beam along an axis perpendicular to or parallel to said substrate, for improving the ability of said vertical control circuit to maintain said gap constant when said cantilever beam is subjected to a rotation-induced force.

27. A rotation rate sensor, comprising:

a mechanical element that has a natural resonant frequency and is subject to a Coriolis force that is proportional to the rate of rotation of said element, said element induced to vibrate in a first direction by the application of electrostatic force and said Coriolis force causing said element to move in a second direction and deviate from said first direction of vibration, a motion sensor that detects motion of said element in said second direction, and a control circuit which applies a counteracting force to said element to maintain a gap between said element and said vertical motion sensor constant, said counteracting force varying with and providing an indication of the rate of rotation of said element, said control circuit having a bandwidth that is greater than said mechanical element's said natural resonant frequency, said wider bandwidth tending to enhance the ability of said control circuit to maintain said gap constant, thereby improving sensor accuracy.

28. A rotation rate sensor, comprising:

a mechanical element subject to a Coriolis force that is proportional to the rate of rotation of said element, said element induced to vibrate in a first direction by the application of electrostatic force and said Coriolis force causing said element to move in a second direction and deviate from said first direction of vibration, said electrostatic force being applied to said mechanical element with narrow, bipolar pulses, said pulses tending to provide stable element vibration and improve sensor accuracy, a motion sensor that detects motion of said element in said second direction, and a control circuit which applies a counteracting force to said element to maintain a gap between said element and said vertical motion sensor constant, said counteracting force varying with and providing an indication of the rate of rotation of said element.

29. A rotation rate sensor, comprising:

a substrate, a tunneling tip on said substrate, a cantilever beam that has a natural resonant frequency and is fixed at one end and suspended above said substrate at a second end at a distance from said tunneling tip so that a tunneling current flows between said cantilever beam and said tunneling tip in response to a voltage applied across said cantilever beam and said tunneling tip, said tunneling current varying in accordance with a gap between said beam and said tunneling tip, a lateral control circuit which causes an electrostatic force to be generated that induces said cantilever beam to laterally oscillate about a null position substantially parallel to said substrate, and a vertical control circuit which receives said tunneling current and causes an electrostatic force to be generated that maintains said gap between said cantilever beam and said tunneling tip substantially constant, said electrostatic force counteracting a Coriolis force that arises from rotation of said cantilever beam about an axis parallel to said cantilever beam, whereby said electrostatic force varies with and provides an indication of the rate of rotation, said vertical control circuit having a bandwidth that is greater than said cantilever beam's said natural resonant frequency, said wider bandwidth tending to enhance the ability of said vertical control circuit to maintain said gap constant, thereby improving sensor accuracy.

30. The rotation rate sensor of claim 29, further comprising a lateral position sensor that provides a signal which varies in accordance with the frequency and amplitude of said lateral oscillation to said lateral control circuit, and a lateral control electrode which applies an electrostatic force on said cantilever beam that induces said lateral oscillation in response to a signal received from said lateral control circuit.

31. A rotation rate sensor, comprising:

a substrate, a tunneling tip on said substrate, a cantilever beam fixed at one end and suspended above said substrate at a second end at a distance from said tunneling tip so that a tunneling current flows between said cantilever beam and said tunneling tip in response to a voltage applied across said cantilever beam and said tunneling tip, said tunneling current varying in accordance with a gap between said beam and said tunneling tip, a lateral control circuit which causes an electrostatic force to be generated that induces said cantilever beam to laterally oscillate about a null position substantially parallel to said substrate, a lateral position sensor that provides a signal which varies in accordance with the frequency and amplitude of said lateral oscillation to said lateral control circuit, and a lateral control electrode which applies an electrostatic force on said cantilever beam that induces said lateral oscillation in response to a signal received from said lateral control circuit, said lateral control circuit providing said signal to said lateral control electrode as narrow, bipolar pulses at the natural resonant frequency of said cantilever beam along an axis of oscillation, said pulses timed such that said pulses apply an electrostatic force on said cantilever beam only as the beam passes through said null position and not at deflection extremes, said timing tending to provide maximum deflection for a given force and stable lateral oscillation, said bipolar pulses reducing electrostatic coupling with said tunneling current, and a vertical control circuit which receives said tunneling current and causes an electrostatic force to be generated that maintains said cap between said cantilever beam and said tunneling tip substantially constant, said electrostatic force counteracting a Coriolis force that arises from rotation of said cantilever beam about an axis parallel to said cantilever beam, whereby said electrostatic force varies with and provides an indication of the rate of rotation.

* * * * *

UNITED STATES PATENT AND TRADEMARK OFFICE
Certificate

Patent No. 5,859,368　　　　　　　　　　　　　　　　　　　　　Patented: January 12, 1999

On petition requesting issuance of a certificate for correction of inventorship pursuant to 35 U.S.C. 256, it has been found that the above identified patent, through error and without any deceptive intent, improperly sets forth the inventorship.
　　Accordingly, it is hereby certified that the correct inventorship of this patent is: Donald R. Cargille, Culver City, CA (US); and Randall L. Kubena, Oak Park, CA (US).

Signed and Sealed this Third Day of April 2007.

*HEZRON E. WILLIAMS*
*Supervisory Patent Examiner*
Art Unit 2856